United States Patent
McLean et al.

(10) Patent No.: US 11,016,483 B2
(45) Date of Patent: May 25, 2021

(54) DRONE WITH TRAINING MODE

(71) Applicant: MerchSource, LLC, Irvine, CA (US)

(72) Inventors: Kirk McLean, Fullerton, CA (US); Lisa Nguyen, Corona Del Mar, CA (US); Michael Gerstner, Mission Viejo, CA (US)

(73) Assignee: MerchSource, LLC, Irvine, CA (US)

( * ) Notice: Subject to any disclaimer, the term of this patent is extended or adjusted under 35 U.S.C. 154(b) by 238 days.

(21) Appl. No.: 16/006,382

(22) Filed: Jun. 12, 2018

(65) Prior Publication Data

US 2018/0356816 A1    Dec. 13, 2018

Related U.S. Application Data

(60) Provisional application No. 62/518,815, filed on Jun. 13, 2017.

(51) Int. Cl.
*G05D 1/00*    (2006.01)
*G05D 1/04*    (2006.01)
*B64C 39/02*    (2006.01)
*G05D 1/08*    (2006.01)

(52) U.S. Cl.
CPC ......... *G05D 1/0055* (2013.01); *B64C 39/024* (2013.01); *G05D 1/0022* (2013.01); *G05D 1/042* (2013.01); *G05D 1/0816* (2013.01); *B64C 2201/146* (2013.01)

(58) Field of Classification Search
CPC .. G05D 1/0055; G05D 1/0022; G05D 1/0816; G05D 1/042; B64C 39/024; B64C 2201/146
See application file for complete search history.

(56) References Cited

U.S. PATENT DOCUMENTS

| | | |
|---|---|---|
| 3,053,480 A | 9/1962 | Vanderlip |
| 3,106,369 A | 10/1963 | Borst |
| 3,231,221 A | 1/1966 | Platt |
| 7,195,200 B2 | 3/2007 | Yamane |
| 7,472,863 B2 | 1/2009 | Ak |
| 7,584,071 B2 | 9/2009 | Lee |
| 7,931,239 B2 | 4/2011 | Pedersen et al. |
| 8,052,081 B2 | 11/2011 | Olm et al. |

(Continued)

OTHER PUBLICATIONS

Propel, High Performance Battle Drones, T-65 X-Wing, Pilot's Handbook, 2017 (Year: 2017).*

(Continued)

*Primary Examiner* — Thomas Ingram
(74) *Attorney, Agent, or Firm* — Renner, Otto, Boisselle & Sklar, LLP

(57) ABSTRACT

A system and method for operating an indoor/outdoor drone in a training mode that limits the maximum altitude during flight, restricts the ability to perform rapid maneuvers, and also may disable the ability to conduct aerial stunts. The system includes a flight controller that may select between the training mode, a normal mode, and a stunt mode. In the training mode, the flight controller restricts an increase in altitude of the drone beyond an altitude threshold, and also restricts an increase in one or more movement parameters of the drone beyond respective movement parameter thresholds. The selection of the training mode may disable the ability for the user to select the stunt mode.

18 Claims, 5 Drawing Sheets

(56) References Cited

U.S. PATENT DOCUMENTS

| | | |
|---|---|---|
| 8,106,748 B2 | 1/2012 | Lee |
| 8,214,088 B2 | 7/2012 | Lefebure |
| 8,292,215 B2 | 10/2012 | Olm et al. |
| 8,322,648 B2 | 12/2012 | Kroetsch et al. |
| 8,453,962 B2 | 6/2013 | Shaw |
| 8,474,761 B2 | 7/2013 | Callou |
| 8,634,781 B2 | 1/2014 | Yu |
| 8,725,314 B2 | 5/2014 | Chaperon et al. |
| 8,958,928 B2 | 2/2015 | Seydoux et al. |
| 8,983,684 B2 | 3/2015 | Callou et al. |
| 8,989,924 B2 * | 3/2015 | Seydoux ............... A63H 27/12 244/17.13 |
| 9,004,396 B1 | 4/2015 | Colin et al. |
| 9,004,973 B2 | 4/2015 | Condon et al. |
| 9,016,617 B2 | 4/2015 | Wang et al. |
| 9,057,273 B2 | 6/2015 | Wang et al. |
| 9,073,532 B2 | 7/2015 | Pedersen et al. |
| 9,108,728 B2 | 8/2015 | Shaw |
| 9,221,536 B2 | 12/2015 | Wang et al. |
| 9,233,754 B1 | 1/2016 | Wang et al. |
| D751,026 S | 3/2016 | Tao |
| 9,284,040 B2 | 3/2016 | Wang et al. |
| 9,446,845 B2 | 9/2016 | Mintchev et al. |
| 9,501,060 B1 * | 11/2016 | Zhang .................. B64C 39/024 |
| 9,573,683 B2 | 2/2017 | Martin et al. |
| 9,623,967 B2 | 4/2017 | Mallard |
| 2015/0259066 A1 | 9/2015 | Johannesson et al. |
| 2016/0016654 A1 | 1/2016 | Wang et al. |
| 2016/0176520 A1 | 6/2016 | Goldstein |
| 2016/0200418 A1 | 7/2016 | Wang et al. |
| 2016/0340021 A1 | 11/2016 | Zhang et al. |
| 2016/0340028 A1 | 11/2016 | Datta |
| 2017/0036771 A1 * | 2/2017 | Woodman ............... B64D 47/08 |
| 2017/0043870 A1 | 2/2017 | Wu et al. |
| 2017/0121016 A1 | 5/2017 | Wang et al. |
| 2017/0197703 A1 | 7/2017 | Wood |

OTHER PUBLICATIONS

Mike Prospero, Propel Star Wars Dron Review: The Drones You're Looking for, Tom's Guide, Dec. 23, 2016, (Year: 2016).*

Dirk Dallas, DJI Go App: A Step-by-Step Guide Through Every Menu & Button (Video & Written Tutorial), Oct. 22, 2016 (Year: 2016).*

Tangible Travis, Propel Star Wars—X-Wing Drone in Training Mode—YouTube, Jan. 5, 2017, https://www.youtube.com/watch?v=SQdTlt90je8 (Year: 2017).*

Akaso, F250S RTF Racer Quadcopter QAV 250 Carbon Fiber Frame w/ Remote Control; https://www.amazon.com/AKASO-Quadcopter-carbon-Remote-Control/dp/B01H6BCHKQ.

* cited by examiner

DRONE WITH TRAINING MODE

RELATED APPLICATIONS

This application claims the benefit of U.S. Provisional Application No. 62/518,815 filed Jun. 13, 2017, which is hereby incorporated herein by reference in its entirety.

TECHNICAL FIELD

The present disclosure relates generally to unmanned aerial vehicles, also referred to as drones, and more particularly to a system and method of operating an indoor/outdoor drone in a training mode.

BACKGROUND

People of all ages find enjoyment in flying small aerial vehicles known as drones, which are quickly becoming one of the most popular toys in the consumer electronics industry. Users typically want the ability to fly their drone with speed and agility to elevated heights, while also having the ability to perform flips, rolls, or other various stunts. Novice users, however, find it difficult to fly these high-performance drones right out of the box. As such, novice users typically practice their flying skills indoors by making careful landings and maneuvers around obstacles inside their home. With a relative lack of experience behind the controls, the novice user inevitably finds the rapid movements and high-altitude capabilities of the drone too difficult to handle, which often leads to crashing the drone into walls, ceilings, or other items inside of the person's home.

SUMMARY

The present disclosure provides an indoor/outdoor drone having a flight control system that enhances the out-of-box experience for novice users. In particular, the system provides a training mode that limits the maximum altitude during flight, restricts the ability to perform rapid maneuvers, and also may disable the ability to conduct aerial stunts.

More particularly, according to one aspect of the present disclosure, a flight system for a drone is provided that includes at least one controller having a training mode configured to restrict an increase in altitude of the drone beyond an altitude threshold, and also to restrict an increase in a movement parameter of the drone beyond a movement parameter threshold.

Embodiments according to the present disclosure may include one or more of the following additional features separately or in combination.

For example, the at least one controller may be configured to switch between the training mode, a normal mode, and a stunt mode.

The at least one controller may be configured to disable switching to the stunt mode when in the training mode.

The altitude threshold may be a maximum altitude level relative to a reference altitude, such as the ground.

In exemplary embodiments, the altitude threshold is in the range from 1 meter to 4 meters, more particularly 2 meters to 3 meters, and more particularly 2.5 meters.

When in the training mode, the at least one controller may be configured to: (i) determine the altitude threshold; (ii) determine the actual altitude of the drone; (iii) restrict an increase in the actual altitude of the drone based upon a determination that the actual altitude is greater than or equal to the altitude threshold; and/or (iv) permit an increase in the actual altitude of the drone based upon a determination that the actual altitude is less than the altitude threshold.

When in the training mode, the at least one controller may further be configured to decrease the altitude of the drone based upon a determination that the actual altitude is greater than or equal to the altitude threshold.

When in the training mode, the at least one controller may be configured to: (i) determine the movement parameter threshold; (ii) determine the actual movement parameter of the drone; (iii) restrict an increase in the actual movement parameter of the drone based upon a determination that the actual movement parameter is greater than or equal to the movement parameter threshold; and/or (iv) permit an increase in the actual movement parameter of the drone based upon a determination that the actual movement parameter is less than the movement parameter threshold.

When in the training mode, the at least one controller may further be configured to decrease the movement parameter of the drone based upon a determination that the actual movement parameter is greater than or equal to the movement parameter threshold.

The movement parameter of the drone may include one or more of: (i) tilt angle, such as pitch or roll angle; (ii) lateral movement speed, such as the speed moving forward, rearward, left, right, or combinations thereof; (iii) horizontal movement speed, such as ascending or descending speed; (iv) rotational speed, such as yaw speed; and/or (v) other such parameters that affect movement, including but not limited to rotational speed of one or more motors.

The movement parameter threshold may include one or more of: (i) maximum tilt angle, such as pitch or roll angle; (ii) maximum lateral movement speed, such as the speed moving forward, rearward, left, right, or combinations thereof; (iii) maximum horizontal movement speed, such as ascending or descending speed; (iv) maximum rotational speed of the drone, such as yaw speed; and/or (v) other such maximum movement parameters that limit movement, including but not limited to maximum rotational speed of one or more motors.

In exemplary embodiments, the movement parameter threshold is a rotational speed limit of one or more motors of the drone.

The speed limit of the one or more motors may be in the range from 40 to 80% of a maximum rotational speed of the motors, and more particularly 60% of the maximum rotational speed of the motors.

The altitude threshold and/or the movement parameter threshold may each be a predefined value.

The altitude threshold and/or the movement parameter threshold may be non-adjustable by a user when in the training mode.

According to another aspect of the present disclosure, a system for controlling flight of an indoor/outdoor drone is provided, the system including: one or more motors operatively coupled to one or more propellers that enable aerial lift and movement of the drone when in flight; at least one controller operatively coupled to the one or more motors, the at least one controller configured to switch between a training mode and a normal mode; wherein, when the at least one controller is switched to the training mode, the at least one controller is configured to: (i) determine an actual altitude of the drone and actual speed of the one or more motors; (ii) determine an altitude threshold and a motor speed threshold; (iii) based upon a determination that the actual altitude is greater than or equal to the altitude threshold, restrict an increase in the actual altitude of the drone;

(iv) based upon a determination that the actual altitude is less than the altitude threshold, permit an increase in the actual altitude of the drone; (v) based upon a determination that the actual speed of the one or more motors is greater than the motor speed threshold, restrict an increase in the actual speed of the one or more motors; and/or (vi) based upon a determination that the actual speed of the one or more motors is less than the motor speed threshold, permit an increase in the actual speed of the one or more motors.

According to another aspect of the present disclosure, a method of operating a drone in a training mode is provided, including the steps of: (i) restricting an increase in altitude of the drone beyond an altitude threshold, (ii) restricting an increase in a movement parameter of the drone beyond a movement parameter threshold.

According to another aspect of the present disclosure, a method of operating a drone in a training mode is provided, including the steps of: (i) determining an actual altitude of the drone, and determining an actual speed of one or more motors; (ii) determining an altitude threshold and a motor speed threshold; (iii) restricting an increase in the actual altitude of the drone based upon a determination that the actual altitude is greater than or equal to the altitude threshold; (iv) permitting an increase in the actual altitude of the drone based upon a determination that the actual altitude is less than the altitude threshold; (v) restricting an increase in the actual speed of the one or more motors based upon a determination that the actual speed of the one or more motors is greater than the motor speed threshold; and/or (vi) permitting an increase in the actual speed of the one or more motors based upon a determination that the actual speed of the one or more motors is less than the motor speed threshold.

The following description and the annexed drawings set forth certain illustrative embodiments according to the present disclosure. These embodiments are indicative, however, of but a few of the various ways in which the principles according to the disclosure may be employed. Other objects, advantages and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects according to the present disclosure.

DETAILED DESCRIPTION

The principles and aspects of the present disclosure have particular application to indoor/outdoor unmanned aerial vehicles, also referred to as consumer-grade drones, and thus will be described below chiefly in this context. It is also understood, however, that the principles and aspects according to the present disclosure may be applicable to other unmanned aerial vehicles for other applications, particularly where it is desirable to provide a training mode that limits flying altitude, restricts rapid flying maneuvers, and/or disables the ability to perform aerial stunts.

Figure 1:
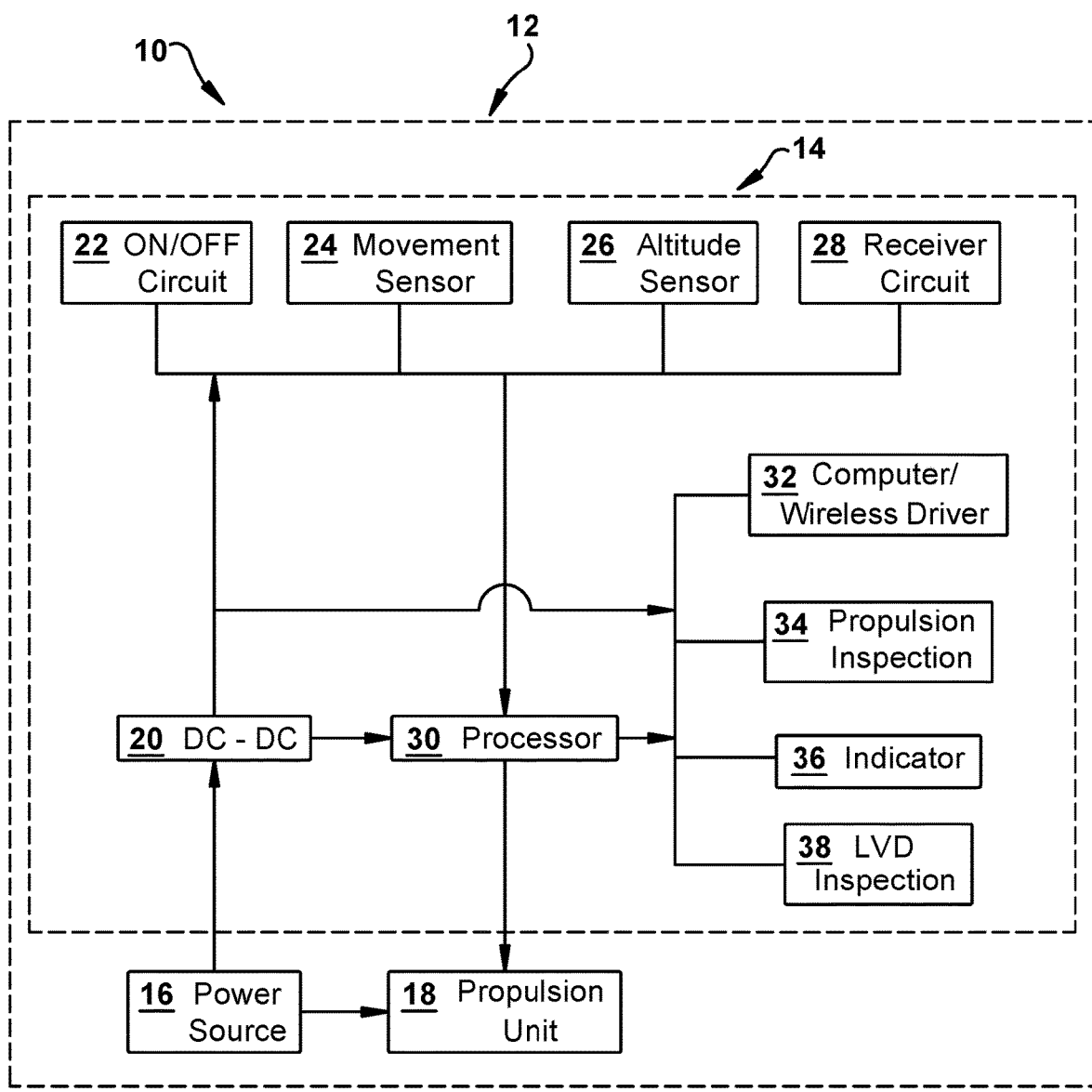
FIG. 1 is a schematic block diagram of an exemplary drone according to an embodiment of the present disclosure.

Referring to FIG. 1, a schematic block diagram of an exemplary drone 10 is shown. Generally, the drone 10 includes a vehicle body 12 that carries at least one controller 14, at least one power source 16, and one or more propulsion units 18 for enabling controlled flight of the drone 10.

The one or more propulsion units 18 each may include a motor, such as an electric motor, and at least one propeller (or rotor) operatively coupled to the motor for effecting aerial lift and movement of the drone 10. The propulsion units 18 may be powered by the power source 16, which may be a battery, such as a rechargeable lithium ion battery that provides DC power to each motor. The controller 14 may be operatively coupled to the one or more propulsion units 18, such that the controller may control the propulsion units 18 to cause the drone 10 to maintain or change position, as discussed in further detail below.

In exemplary embodiments, the drone 10 may include four propulsion units 18 equally spaced about the drone 10, which are independently operable by the controller 14 for effecting movement of the drone 10. For example, to move the drone 10 in a forward direction, two rear propulsion units 18 may speed up relative to the two front propulsion units 18 to pitch the drone forward; and to move in reverse, the two front propulsion units 18 may speed up relative to the two rear propulsion units 18 to pitch the drone backward. Likewise, to move the drone to the left (also referred to as "roll" left), the two right propulsion units 18 may speed up relative to the two left propulsion units 18; and to roll to the right, the left propulsion units 18 are sped up relative to the right propulsion units 18. The drone 10 also may pivot or "yaw" to the left or right, for example, by speeding up diametrically opposed front-right and back-left propulsion units 18 to yaw right; or by speeding up diametrically opposed front-left and back-right propulsion units 18 to yaw left. To increase the altitude of the drone 10 (also referred to as ascending or climbing), all four propulsion units 18 may increase in speed at the same time to generate enough thrust to lift the drone 10. Similarly, to decrease the altitude of the drone 10, the propulsion units 18 may be slowed down to allow the effect of gravity to overcome the upward thrust produced by the propulsion units 18. It is understood that although four propulsion units 18 may be employed in exemplary embodiments, less than four or more than four units also may be employed, as would understood by those having ordinary skill in the art. For example, a single motor may drive multiple propulsion units, or a single propulsion unit may be driven by multiple motors.

The at least one controller 14 (also referred to as the flight controller 14) may include one or more electronic devices, processors, circuits, memory, and/or sub-controllers for controlling flight of the drone 10. As shown in the illustrated embodiment, the at least one controller 14 may receive power from the power source 16, such as via a DC-DC converter 20 that reduces the voltage from the power source 16 to the controller 14. The controller 14 may include an on/off circuit 22, or switch, that powers up or powers down the drone 10. The controller 14 may include one or more movement sensor circuits 24 for determining movement and/or position of the drone 10. The controller 14 also may include one or more altitude sensor circuits 26 for determining the altitude of the drone 10. At least one receiver circuit 28 may be provided for receiving communication from a transmitter or other functional device that allows a user to interact and control the drone 10.

The one or more movement sensor circuits 24 may include suitable circuits and/or devices for determining movement of the drone 10. In exemplary embodiments, the one or more movement sensor circuits 24 may include one or more inertial measurement units (IMUs). For example, the IMUs may include one or more accelerometers, one or more gyroscopes, one or more magnetometers, or suitable combinations thereof. For example, the IMU may include up to three orthogonal accelerometers to measure linear acceleration of the movable object along up to three axes of translation, and up to three orthogonal gyroscopes to measure the angular acceleration about up to three axes of rotation. In exemplary embodiments, the movement sensor circuit 24 includes a 6-axis microelectromechanical system (MEMS) circuit, which may include a 3-axis MEMS accelerometer and a 3-axis MEMS gyroscope. The one or more movement sensor circuits 24 may be operatively coupled to the vehicle body 12 to allow the motion of the drone 10 to be determined by the movement sensor circuit 24. In this manner, the movement sensor circuit(s) 24 may sense and then provide a signal indicative of the motion of the drone 10, such as a position, orientation, velocity, and/or acceleration of the drone 10 with respect to one, two, or three axes of translation, and/or one, two, or three axes of rotation. In exemplary embodiments, the one or more movement sensor circuits 24 may include or be used in conjunction with other location determining devices, such as GPS, visual sensors, ultrasonic sensors, or communication units.

The one or more altitude sensor circuits 26 may include suitable circuits and/or devices for determining the absolute altitude (e.g., relative to a reference) and/or true altitude (e.g., relative to sea level) of the drone 10. In exemplary embodiments, the one or more altitude sensor circuits 26 may determine the altitude of the drone 10 relative to a fixed level. For example, the altitude sensor 26 may include a pressure sensor, such as a barometer, that detects the change in air pressure as the drone 10 climbs or dives to change altitude. Other examples of altitude sensors include, but are not limited to, pressure altimeters, sonic altimeters, radar altimeters, GPS, and satellites. Some altitude sensors, such as a radar altimeter, may measure altitudes that correspond to the absolute altitude. Some altitude sensors, such as a GPS, may measure altitudes that correspond to the true altitude rather than an absolute altitude.

Figure 2:
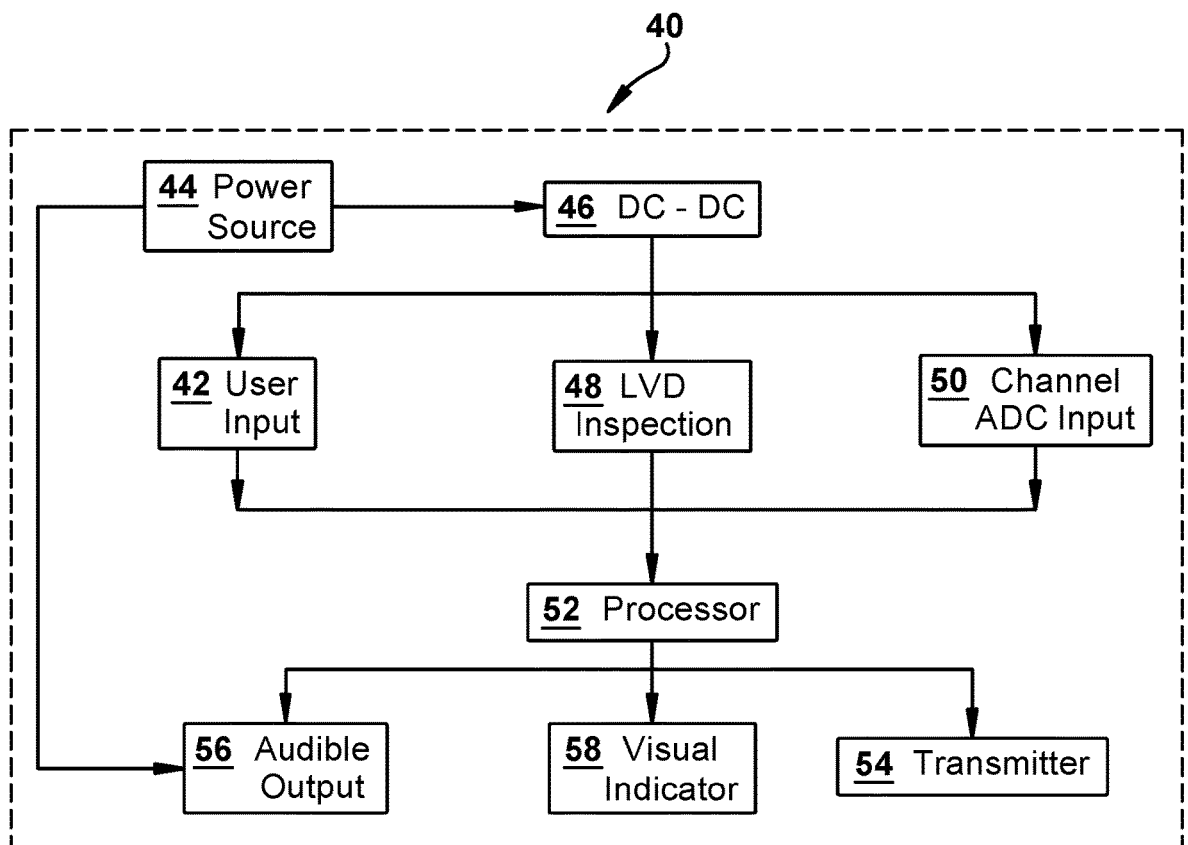
FIG. 2 is a schematic block diagram of an exemplary transmission device according to an embodiment of the present disclosure, which may be used for controlling the drone in FIG. 1.

The receiver circuit 28 may include one or more suitable circuits and/or devices for enabling the flight controller 14 to receive information and communicate with an external device, such as a transmitter 40 (shown in FIG. 2). Generally, the transmitter 40 may be a control apparatus that may provide one or more commands or sets of instructions for controlling flight of the drone 10. In exemplary embodiments, a user may interact with the transmitter 40 to provide command instructions for controlling flight of the drone 10, as discussed in further detail below.

Figure 4:
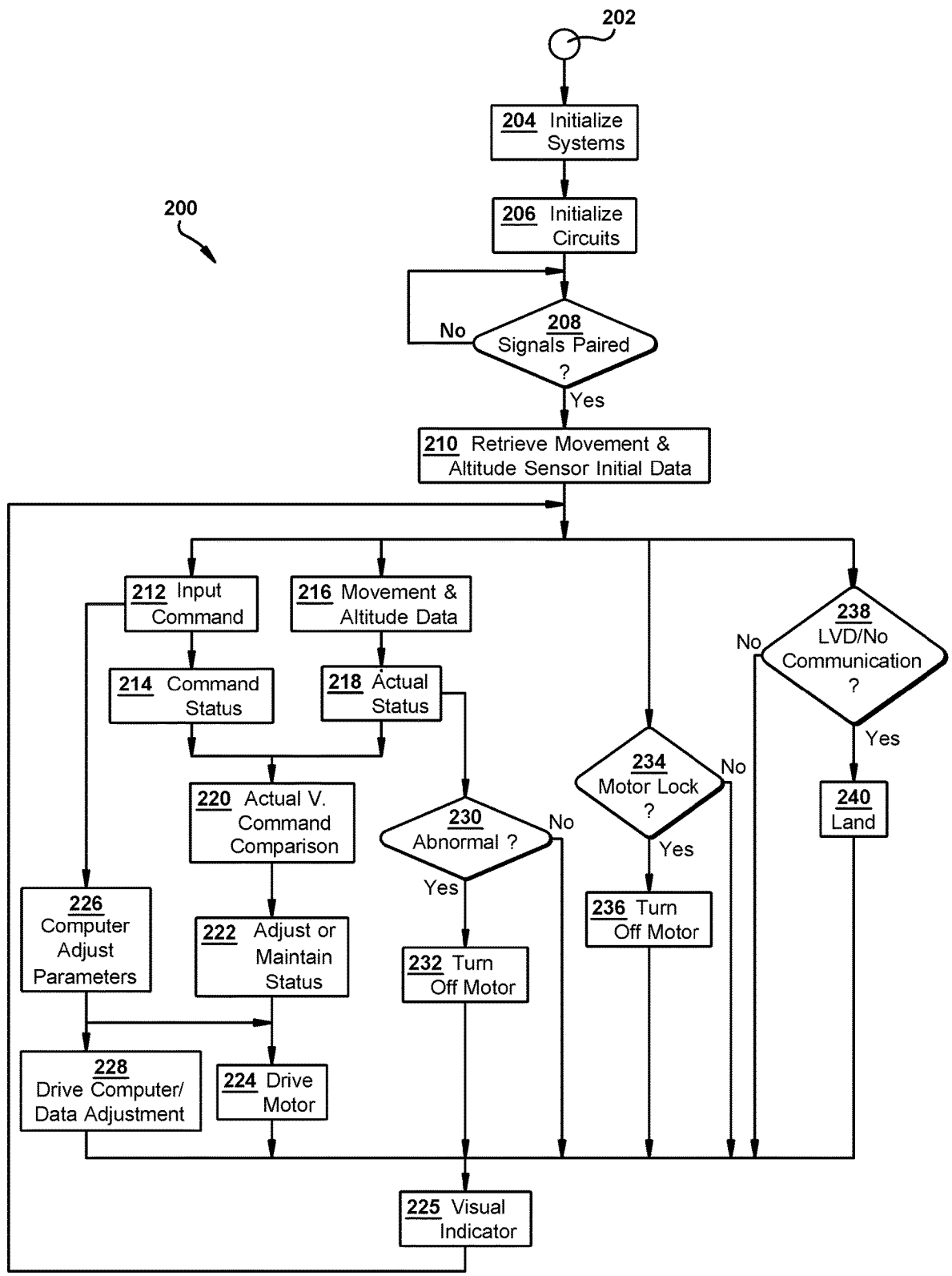
FIG. 4 is a flow diagram of an exemplary method of operating the drone in FIG. 1 in a normal mode of operation according to an embodiment of the present disclosure.
Figure 5:
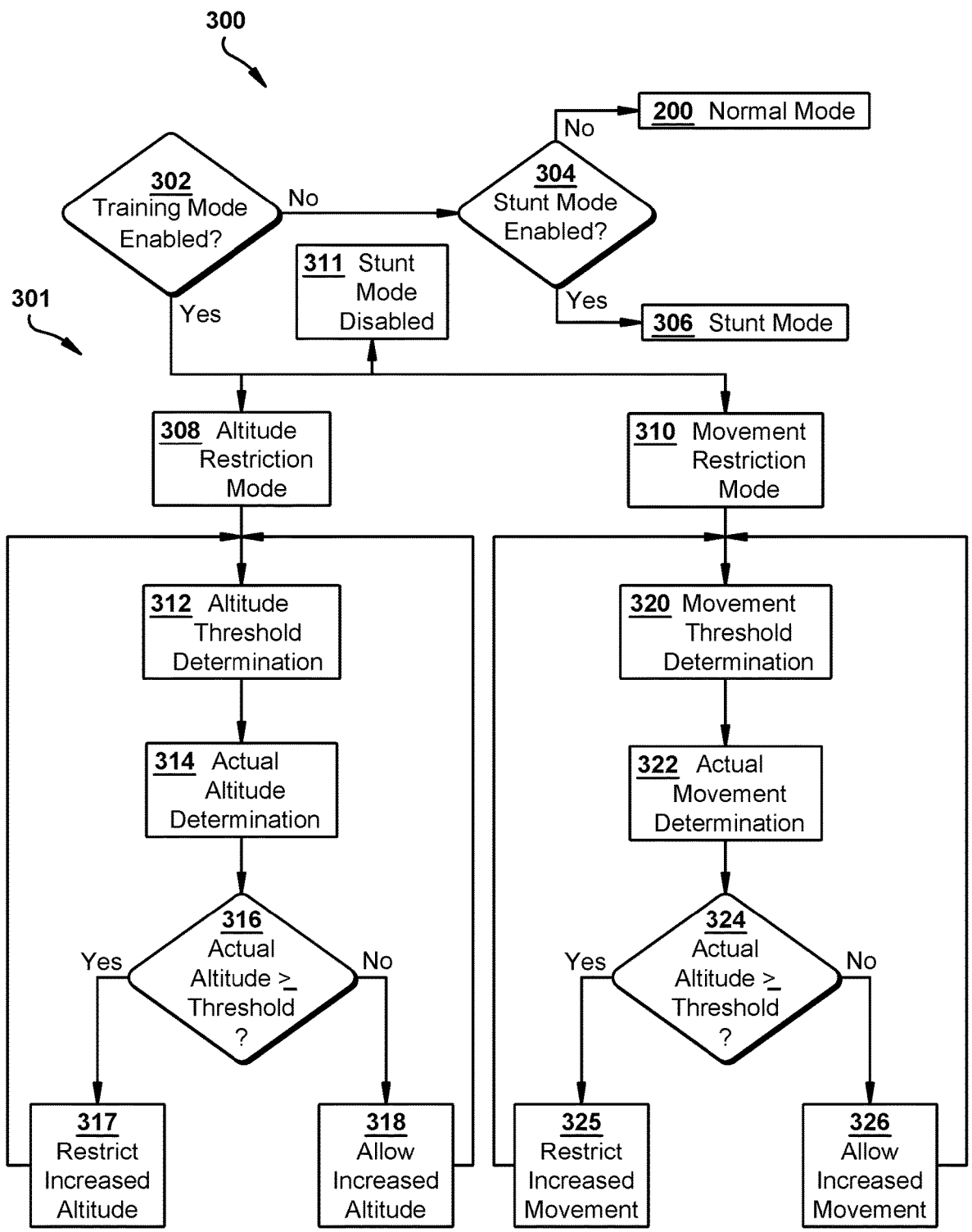
FIG. 5 is a flow diagram of an exemplary method of operating the drone in FIG. 1 in a training mode, a normal mode, and/or a stunt mode according to an embodiment of the present disclosure.

The flight controller 14 also may include at least one processor 30 that receives signals or information from one or more circuits (e.g., the on/off circuit 22, the movement sensor circuit 24, the altitude sensor circuit 26, and the receiver circuit 28), and then processes the information to send signals, commands or other information to control the flight of the drone 10. For example, based upon a determination of the movement of the drone from the movement sensor(s) 24, the altitude of the drone from the altitude sensor(s) 26, and an input command from the user as received by the receiver circuit 28, the processor 30 may process this information to then command the one or more propulsion units 18 to maintain or change the position of the drone 10. The processor 30 also may obtain information from memory devices, which may include non-transitory computer readable media. Generally, the at least one processor 30 is capable of performing calculations and/or utilizing algorithms to generate a flight command for the drone 10, which may include code, logic, or instructions for performing one or more steps as shown in FIGS. 4 and 5, as discussed in further detail below.

As shown, the processor 30 also may communicate signals or commands to or from one or more other circuits of the controller 14 for enabling one or more other functions of the drone 10. For example, the processor 30 may send or receive signals or commands to or from the one or more propulsion units 18, or speed sensors thereof, for determining the speed of the motors, or the processor 30 may calculate the speed based on the power supplied to the motors. The processor 30 may send or receive signals or commands to or from a computer/wireless driver 32 for communicating (e.g., wirelessly) with an external computer, such as a desktop computer, tablet or smartphone. The processor 30 may send or receive signals or commands to or from a propulsion unit inspection circuit 34 for determining whether one or more of the propulsion units 18 are operating normally. The processor 30 may send or receive signals or commands to or from one or more indicators 36, such as a visual indicator, for example a light emitting diode. The processor 30 also may send or receive signals or commands to or from a low voltage directive (LVD) inspection circuit for determining whether the electrical equipment, such as the battery or motors, are operating within specified voltage limits, such that a low power warning may be provided if a low voltage is detected.

Referring to FIG. 2, an exemplary embodiment of the transmission device 40 is shown in further detail. The transmission device 40 is an external and separate device from the drone 10, and may include a transmission device controller that provides one or more commands to control the flight of the drone 10. Generally, the transmission device 40 may be used to control any suitable state of the drone 10, for example, changing the position, altitude, and/or orientation of the drone 10. As shown, a user may interact with the transmission device 40 via a user input circuit 42 to provide command instructions for controlling flight of the drone 10. For example, the user input circuit 42 may include a user interface, including one or more buttons, switches, joysticks, mouse, touchscreen, or display. It is understood that although the transmission device 40 may be a handheld device or wearable device having a user interface, the transmission device 40 may also be provided in other forms. For example, the transmission device 40 may include a smartphone, tablet, laptop, computer, glasses, gloves, helmet, microphone, or suitable combinations thereof.

In exemplary embodiments, the transmission device 40 may be a standalone unit having its own power source 44, which may supply power to the transmitter controller via a DC-DC converter 46. The transmission device 40 may include a low voltage directive (LVD) inspection circuit 48 for determining whether the transmission device 40 is operating at low power. The transmission device 40 also may include a channel ADC input circuit 50, for converting analog signals into digital signals, which may be utilized for establishing one or more communications channels between the transmission device 40 and the flight controller 14. The transmission device 40 also may include at least one processor 52 that receives signals or information from one or more circuits (e.g., user input circuit 42, LVD inspection circuit 48, and channel ADC input circuit 50), and then processes the information to send signals, commands or information to the flight controller 14 via a transmitter 54 to control the flight of the drone 10. The processor 52 may communicate signals or commands to one or more other circuits of the transmission device 40 for enabling one or more other functions of the transmission device. For example, the processor 52 may send signals or commands to an audible output 56, such as a buzzer, and a visual indicator 58, such as an LED, for alerting the user of the state of the transmission device 40 and/or drone 10.

The transmitter circuit 54 of the transmission device 40 may communicate with the receiver circuit 28 of the drone 10 via a wireless connection. The wireless communication may occur directly between the external device and the receiver and/or may occur over a network, or other forms of indirect communication. In exemplary embodiments, the communications may occur directly, over a local area network (LAN), wide area network (WAN) such as the Internet, cloud environment, telecommunications network (e.g., 3G, 4G), WiFi, Bluetooth, radiofrequency (RF), infrared (IR), or any other suitable communications technique. Communications between the transmission device 40 and the drone 10 may be two-way communications and/or one-way communications. In a two-way communication, the drone 10 may provide information to the transmission device 40, such as information about the location of the drone 10, information sensed by one or more sensors of the drone 10, images or video provided by a camera attached to the drone 10, or other data from the drone 10. It is understood that the transmission device 40 may operate other functions of the drone 10, such as one or more settings or parameters of the drone, one or more sensors, or any other operations of the drone 10.

Figure 3:
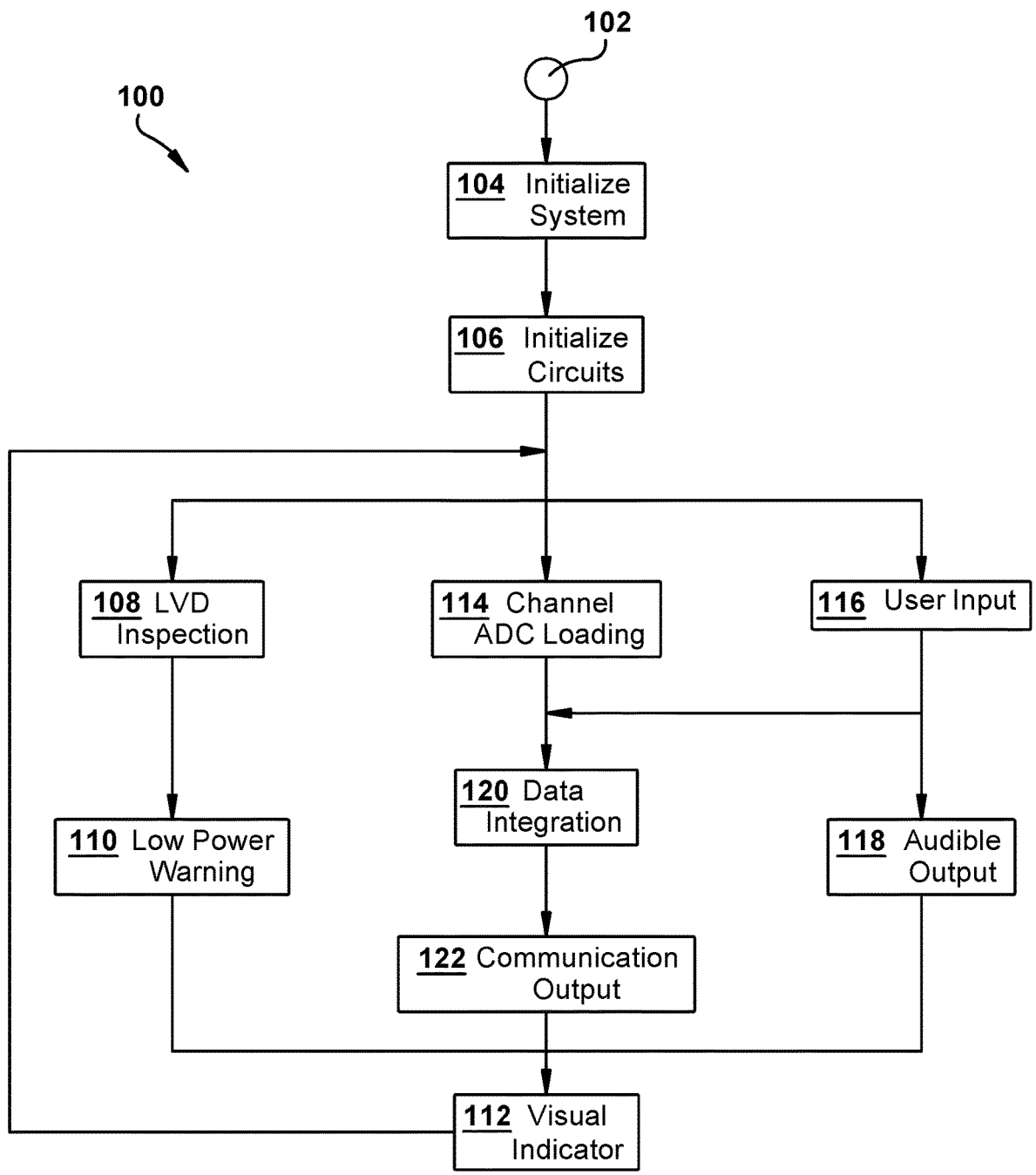
FIG. 3 is a flow diagram of an exemplary method of transmitting signals from the transmission device in FIG. 2 for controlling the drone in FIG. 1.

Referring to FIG. 3, a flow chart is shown that illustrates an exemplary process 100 for operating the transmission device 40. The process 100 may begin at step 102. At step 104, the system (e.g., transmission device controller) may be initialized, and at step 106 the various circuits that provide functionality (e.g., user input circuit 42, LVD inspection circuit 48, etc.) also may be initialized. At step 108, an LVD inspection may be performed by the LVD inspection circuit 48, and if a low power state is determined, then a low power warning may be generated at step 110, which may be indicated by the visual indicator 58 at step 112.

As shown at step 114, the analog-to-digital communications channels may be loaded via the channel ADC input circuit 50, which may establish a communications link between the transmission device 40 and the drone 10. In addition, at step 116, a user input may be detected via the user input circuit 42, and optionally at step 118 there may be an audible output via the audible output circuit 56 indicating that the user input has been received. The user input from step 116 may be paired with the channel ADC loading from step 114 to convert the analog user input into digital data, and the data may be integrated at step 120 via the processor 52 to provide one or more commands for controlling the drone 10. The data (e.g., commands) from step 120 are then transmitted at step 122 via the transmitter circuit 34 (e.g., via radio frequency), and the transmitted commands are then received by drone receiver circuit 28 to control the drone 10.

The visual indicator 58 may indicate that the data is being communicated, as shown at step 112. The process 100 may then repeat as desired.

Referring to FIG. 4, a flow chart is shown that illustrates an exemplary process 200 for operating the drone 10 in a normal operational mode. The process 200 may begin at step 202. At step 204, the system (e.g., flight controller 14, or more particularly processor 30) may be initialized, and at step 206 the various circuits that provide functionality (e.g., movement sensor circuit 24, altitude sensor circuit 26, receiver circuit 28, etc.) also may be initialized. At step 208, a determination may be made whether a communication link has been established between the transmission device 40 and the drone 10, such as via pairing the wireless signals between the transmitter circuit 54 and the receiver circuit 28. If the signals have not been paired, then the system retries establishing the communications link. If the signals have been successfully paired, then the process may move on to step 210.

At step 210, the processor 30 retrieves the initial data from the one or more movement sensor circuits 26 and/or the one or more altitude sensor circuits 28. This may allow the altitude and/or movement data to be zeroed in order to establish reference points that may be compared against the altitude and/or movement data after the drone 10 is in flight. For example, retrieving the initial altitude data of the drone 10 when on the ground may establish the ground as the reference point, such that an altitude limit of 2.5 meters, for example, may be the altitude limit relative to the ground (e.g., absolute altitude, as opposed to the true altitude above mean sea level).

At step 212, the user may interface with the transmission device 40 for controlling flight of the drone 10, and the processor 30 may receive the user input commands via the receiver circuit 28 (e.g., via WiFi or radio frequency from the transmitter circuit 34 of the transmission device 40). At step 214, the status of the user input commands from step 212 may be determined and/or stored by the processor 30. At step 216, the processor 30 also may retrieve data from the at least one movement sensor 24 and/or the at least one altitude sensor 26 for determining the actual altitude and/or movement of the drone 10 (e.g., during flight). At step 218, the status of the altitude and/or movement data from step 216 may be determined and/or stored by the processor 30. As shown, the steps of processing and/or storing the user input (e.g., steps 212 and 214) may be performed at essentially the same time as the steps of processing and/or storing the altitude and/or movement data of the drone (e.g., steps 216 and 218); however, it is understood that these steps may be performed sequentially with one another or independent of one another.

At step 220, the data of the user input command from step 214 may then be compared to the data of actual movement (e.g., speed, inertia, tilt, etc.) and/or altitude from step 218. Based upon the comparison of data at step 220, the process proceeds to step 222 to determine whether to adjust or maintain the status of the drone 10 (e.g., altitude and/or positional movement, such as roll, pitch, yaw, etc.). Based upon this determination, the processor 30 may send signals to the one or more propulsion units 18 to drive the one or more motors to affect such movement, or to maintain the position of the drone 10 (as depicted at step 224). In this manner, the one or more motors may independently maintain their respective speeds, increase speeds, or decrease speeds based upon the user input command compared to the actually measured movement and/or altitude of the drone 10. The process 200 also may provide self-stabilization of the drone 10 to maintain altitude or position (e.g. hover), as desired. This self-stabilization also may provide limits to the maximum tilt angle of the drone to prevent inversions. Optionally, an audible and/or visual indication may be generated at step 225 to indicate completion of the foregoing step(s), and the process may then repeat.

As shown in the illustrated embodiment, the input command 212 also may include a command signal for enabling a computer to adjust the various parameters associated with the flight of the drone (as shown at step 226, for example). The computer for adjusting the parameters at step 226 may include one or more of the transmission device 40 or a separate device, either or both of which may include a handheld controller, smartphone, tablet, laptop, desktop computer, or the like, or suitable combinations thereof. In exemplary embodiments, the adjustable flight parameters at step 226 may include one or more of: i) setting a maximum or minimum pitch or roll angle, or setting a maximum or minimum speed of movement to the front, back, left, or right; ii) setting a maximum or minimum ascending or descending speed; iii) setting a maximum or minimum yaw speed, or speed at which the drone rotates about its axis; iv) setting a maximum or minimum altitude, which may be the absolute altitude above the ground; iv) setting a maximum or minimum distance traveled from the user, which may be determined by communication with the transmitter device; and v) selecting between one or more predetermined modes, which may include a headless (e.g., orientation independent) or non-headless mode, training mode, normal mode, and/or stunt mode, as described in further detail below.

As shown, following step 226, the one or more adjusted flight parameters described above may be utilized to set the above-mentioned limits, modes, or the like. In exemplary embodiments, the information from step 226 may be utilized after the determination of whether to adjust or maintain the status (e.g., position) of the drone at step 222, but before driving the one or more motors at step 224. In this manner, upon receiving the parameters at 226, but before driving the motor(s) at step 224, the system may determine whether to maintain or change the status of the drone (e.g., position) based upon the instructions or information provided at step 226. Alternatively or additionally, the computer parameter(s) adjusted at step 226 may be driven or stored at step 228, which may be carried out in parallel with driving the motor(s), such that upon repeating the processes the one or more parameters would then be obeyed.

As shown in the illustrated embodiment, the process 200 also may include one or more system checks to determine whether abnormal or undesirable conditions exist. For example, at step 230 the system may determine whether the actual status of altitude and/or movement from step 218 is abnormal, for example outside of specified limits. If the status at step 230 is determined to be abnormal, then power to the motor may be suspended at step 232. If the status at step 230 is determined to be normal, then the process may repeat. At step 234, the system may determine whether one or more of the motors is locked-up (e.g., the motor does not speed up as power is applied). If the status at step 234 determines that the motor is locked-up, then power to the motor may be suspended at step 236. If the status at step 234 determines that the motor is not locked-up, then the process may repeat. At step 238, the system may determine whether low voltage of one or more electronic components (e.g., battery) is detected and/or whether a communications signal (e.g., communications link with the transmission device 40) has failed. If the status at step 238 determines that there is a low voltage and/or communications have been suspended, then at step 240 power to the motor(s) may be reduced to land the drone 10. If the status at step 238 determines that the voltage and/or communications are operating normally, then the process may repeat.

Referring to FIG. 5, an exemplary process 300 of switching between various flying modes is shown. In the illustrated embodiment, the process 300 enables the user to select between a normal mode, a stunt mode, and a training mode, each of which will be described in further detail below. In exemplary embodiments, the selection of the mode may be made before the drone 10 is turned on and the system initialized, or the mode may be selected before, during, or after user input for flying the drone 10. In exemplary embodiments, the selection between modes may be made by way of a switch or button on the drone 10, or on the transmission device 40, or may be made by way of another external device, such as a computer, smartphone, or tablet running software that enables such mode switching.

It is understood that the process 300 generally may operate under similar principles as the process 200, and therefore the process 300 may be integrated into the process 200, or may substitute portions of the process 200. For example, the process 300 of switching modes may be integrated into process 200 at step 212, where the user may input or select the desired mode, whereby at step 226 the one or more parameters may be adjusted, which may take effect between steps 222 and 224 (e.g., prior to driving the motor), and/or at step 228 where the data is adjusted and the process repeats. It is understood, however, that one or more steps of the process 300 may be integrated or substituted for various other steps in the process 200, or the process 300 may be a standalone process, as understood by those having ordinary skill in the art in view of the following description.

The process 300 may begin at step 302 by first determining whether a training mode 301 has been enabled or selected by the user. If the training mode 301 has not been selected, then a determination is made at step 304 of whether a stunt mode 306 has been enable or selected by the user. If the stunt mode 306 has not been selected, then the flight controller 14 may operate according to the normal mode 200, as exemplified in FIG. 4. If it is determined that the stunt mode 306 is selected or enabled at step 304, then the flight controller may operate according to the stunt mode 306. The stunt mode 306 may operate under similar principles as the normal mode 200, however, the stunt mode 306 may differ from the normal mode in that self-stabilization controls may be disabled, thereby allowing maximum tilt (e.g., pitch or roll) for permitting flips, rolls, or other forms of inversion.

Generally, the training mode 301 may be utilized to suppress one or more performance characteristics of the drone 10, which may be particularly beneficial for novice users that would like to become familiar with the various flight controls of the drone before advancing to the normal mode 200 or stunt mode 306. Accordingly, as shown in the illustrated embodiment, when the training mode 301 is enabled at step 302, the process 300 may proceed to one or more sub-modes, including an altitude restriction mode 308 and/or a movement restriction mode 310. In exemplary embodiments, entering the training mode 301 also may disable the ability to enter the stunt mode, as shown at step 311, so as to prevent the ability to perform inversions or other maximum tilt maneuvers.

The altitude restriction mode 308 may include a step of determining an altitude threshold, as shown at step 312. The altitude threshold may be a maximum altitude limit, such as maximum elevation level above a reference altitude (e.g., ground) so as to provide an absolute altitude limit. As discussed above, the reference altitude may be determined upon initialization of the altitude sensor at step 210 in FIG. 4, for example. In exemplary embodiments, the altitude threshold may be a predefined altitude level that may be stored into memory, and the determination of step 312 may include retrieving the predefined altitude limit from memory. Such a determination or retrieval of the altitude threshold level according to step 312 may occur at any point after the system initialization of step 204 in FIG. 4, for example, after retrieving the initial altitude data at step 210, or before or after the user input command at step 212, etc. In exemplary embodiments, the altitude threshold may be an altitude level in the range from about 1 meter to about 3.5 meters, or more particularly from about 2 meters to about 3 meters. In preferred embodiments, it has been found that an altitude threshold level of about 2.5 meters (or about 8 feet) may be particularly advantageous for flying the drone 10 indoors while in the training mode. In exemplary embodiments, the predefined altitude threshold is not adjustable by the user when in the training mode 301. It is understood, however, that although the altitude threshold may be a predefined and non-adjustable level when in the training mode 301, other modes, such as the normal mode 200, may allow the maximum altitude level to be adjusted, as discussed above. In other embodiments, the altitude threshold in the training mode also may be adjusted in a similar manner as the normal mode 200 discussed above.

After the altitude threshold has been determined at step 312, the process 300 may proceed to step 314 to determine the actual altitude of the drone 10, such as when in flight (e.g., flying altitude). This may be accomplished by retrieving data from the one or more altitude sensor circuits 26, as described above with reference to step 216 in FIG. 4. It is understood that although step 314 is shown as occurring after step 312, the steps could be reversed or completed in parallel.

At step 316, a determination is made whether the actual altitude of the drone 10 (as determined by the one or more altitude sensors at step 314) is greater than or equal to the altitude threshold (as determined at step 312). If the actual altitude is greater than or equal to the altitude threshold, then the flight controller 14 may signal a command to the one or more propulsion units 18 to restrict increasing altitude of the drone 10, as shown at step 317. In this situation, the flight controller 14 may signal a command to the one or more propulsion units 18 to decrease the altitude of the drone 10 to the altitude threshold. For example, if the altitude of the drone is above the altitude threshold level (e.g., due to wind or inertia), then the controller may signal to the one or more motors to reduce speed allowing the drone 10 to descend. Also for example, if the altitude of the drone is at about the altitude threshold level, then the controller may signal to the one or more motors to maintain speed for hovering at that altitude. Such altitude restriction commands may override or supersede the user input commands to prevent the user from flying the drone above the altitude threshold. On the other hand, if at step 316 it is determined that the actual altitude is not greater than or equal to the altitude threshold, then the flight controller 14 may allow the one or more propulsion units 18 to increase the altitude of the drone 10, as shown at step 318. For example, if the drone 10 is flying below the altitude threshold, then the user may input commands that enable the drone 10 to ascend up to the altitude threshold, which may be accomplished by increasing the speed of the one or more motors. After steps 317 or 318, the process repeats to make determinations based upon the updated altitude data.

Additionally or alternatively, the training mode 301 may be operable to restrict or suppress the movement of the drone via the movement restriction mode 310. In exemplary embodiments, the movement restriction mode 310 may be operable to limit or restrict one or more movement parameters of the drone, including, but not limited to, one or more of: i) tilt angle, such as pitch or roll angle; ii) lateral movement speed, such as speed moving forward, rearward, left, right, or combinations thereof; iii) horizontal movement speed, such as ascending or descending speed; iv) rotational speed, such as yaw speed; and/or v) other such parameters that affect movement, including but not limited to the rotational speed of the one or more motors.

As shown in the illustrated embodiment, the movement restriction mode 310 may include determining a movement parameter threshold at step 320. The movement parameter threshold may be a maximum limit of one or more of the above-mentioned movement parameter types, such as a maximum tilt angle, maximum lateral movement speed, maximum horizontal movement speed, maximum rotational speed, or maximum motor speed. In exemplary embodiments, the movement parameter threshold may be a predefined value that may be stored into memory, and the determination of step 320 may include retrieving the predefined movement parameter limit from memory. Such a determination or retrieval of the movement parameter threshold level according to step 320 may occur at any point after the system initialization of step 204 in FIG. 4, for example, after retrieving the initial altitude data at step 210, or before or after the user input command at step 212, etc. In exemplary embodiments, the movement parameter threshold may be a maximum motor speed in the range from about 40% to about 75% of the maximum speed. In preferred embodiments, it has been found that a maximum motor speed of about 60% of the maximum motor speed may be particularly advantageous for flying the drone 10 indoors while in the training mode. In exemplary embodiments, one or more of the predefined movement threshold parameters is not adjustable by the user when in the training mode 301. It is understood, however, that although the movement parameter threshold may be a predefined and non-adjustable value when in the training mode 301, other modes, such as the normal mode 200, may allow the movement parameter threshold to be adjusted, as discussed above. In other embodiments, the movement parameter threshold in the training mode also may be adjusted in a similar manner as the normal mode 200 discussed above.

After the movement parameter threshold has been determined at step 320, the process 300 may proceed to step 322 to determine the actual movement parameter of the drone 10, such as when in flight (e.g., flying movement, motor speed, etc.). This may be accomplished by retrieving data from the one or more movement sensor circuits 24, as described above with reference to step 216 in FIG. 4, or via speed sensors or other methods for determining speed of the one or more motors. It is understood that although step 322 is shown as occurring after step 320, the steps could be reversed or completed in parallel.

At step 324, a determination is made whether the actual movement parameter of the drone 10 (e.g., as determined by the one or more movement sensors at step 322) is greater than or equal to the movement parameter threshold (e.g., as determined at step 320). If the actual movement parameter is greater than or equal to the movement parameter threshold, then the flight controller 14 may signal a command (e.g., to the one or more propulsion units 18) to restrict increasing the movement parameter of the drone 10, as shown at step 325. In this situation, the flight controller 14 may signal a command (e.g., to the one or more propulsion units 18) to decrease the movement parameter of the drone 10 to the movement parameter threshold. For example, if the motor speed of the drone is at or above the motor speed limit (e.g., movement parameter threshold), such as due to wind or the like, then the controller 14 may signal to the one or more motors to maintain or reduce speed to within the specified parameters. Such movement restriction commands may override or supersede the user input commands to prevent the user from flying the drone at or above the movement parameter threshold. On the other hand, if at step 324 it is determined that the actual parameter movement is not greater than or equal to the movement parameter threshold, then the flight controller 14 may allow (e.g., via the one or more propulsion units 18) to increase the movement parameter of the drone 10, as shown at step 326. For example, if the drone 10 is flying below the motor speed limit, then the user may input commands that enable the drone 10 to increase the motor speed up to the limit. After steps 325 or 326, the process repeats to make determinations based upon the updated movement data.

It is understood that the subject matter described herein may be implemented in combination with digital electronic circuitry, controllers, processors, computer software, firmware, and/or hardware. For example, embodiments may be implemented in a flight control system that uses one or more modules of computer program instructions encoded on a non-transitory computer-readable medium for execution by, or to control the operation of, data processing apparatus. In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of them. The controller may include all apparatus, devices, and machines for processing data, including by way of example a programmable processor, a computer, or multiple processors or computers. The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry. To provide for interaction with a user, embodiments may be implemented using a computer having a display device and/or an input device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

As described herein, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flight system for a drone, comprising at least one controller having a training mode, wherein, when in the training mode the at least one controller is configured to:
   restrict an increase in altitude of the drone beyond an altitude threshold; and
   restrict an increase in a movement parameter of the drone beyond a movement parameter threshold;
   wherein the at least one controller is configured to switch between the training mode, a normal mode, and a stunt mode in response to an input from a user; and
   wherein, when in the training mode, the at least one controller is configured to prohibit switching to the stunt mode when the user actively selects the stunt mode without the user first actively disabling the training mode as a separate input from selecting the stunt mode.

2. The system according to claim 1, wherein the altitude threshold is a maximum altitude level relative to a reference altitude.

3. The system according to claim 2, wherein the reference altitude is determined upon initialization of the at least one controller.

4. The system according to claim 1, wherein when in the training mode, the at least one controller is configured to:
   determine the altitude threshold;
   determine the actual altitude of the drone;
   based upon a determination that the actual altitude is greater than or equal to the altitude threshold, restrict an increase in the actual altitude of the drone; and
   based upon a determination that the actual altitude is less than the altitude threshold, permit an increase in the actual altitude of the drone.

5. The system according to claim 4, wherein when in the training mode, the at least one controller is further configured to:
   decrease the altitude of the drone based upon a determination that the actual altitude is greater than or equal to the altitude threshold.

6. The system according to claim 1,
   wherein the movement parameter of the drone includes one or more of:
   i) tilt angle;
   ii) lateral movement speed;
   iii) horizontal movement speed; and/or
   iv) rotational speed; and
   wherein the movement parameter threshold of the drone includes one or more of:
   i) maximum tilt angle;
   ii) maximum lateral movement speed;
   iii) maximum horizontal movement speed; and/or
   iv) maximum rotational speed, such as yaw speed.

7. The system according to claim 1, wherein the movement parameter threshold is a maximum movement parameter relative to a reference movement parameter.

8. The system according to claim 7, wherein the reference movement parameter is determined upon initialization of the at least one controller.

9. The system according to claim 1, wherein:
   the movement parameter is rotational speed of the one or more motors, and
   the movement parameter threshold is a maximum rotational speed limit of one or more motors, the speed limit being in the range from 40 to 80% of a maximum rotational speed of the motors.

10. The system according to claim 1, wherein when in the training mode, the at least one controller is configured to:
    determine the movement parameter threshold;
    determine the actual movement parameter of the drone;
    based upon a determination that the actual movement parameter is greater than or equal to the movement parameter threshold, restrict an increase in the actual movement parameter of the drone; and
    based upon a determination that the actual movement parameter is less than the movement parameter threshold, permit an increase in the actual movement parameter of the drone.

11. The system according to claim 10, wherein when in the training mode, the at least one controller is further configured to:
decrease the movement of the drone based upon a determination that the actual movement is greater than or equal to the movement threshold.

12. The system according to claim 1, wherein at least one of the altitude threshold and the movement threshold is a predefined value.

13. The system according to claim 1, wherein the altitude threshold is not adjustable when in the training mode.

14. The system according to claim 1, further comprising:
one or more propulsion units operatively coupled to the at least one controller, the one or more propulsion units being configured to effect a change in altitude and/or movement of the drone;
wherein, when in the training mode, the at least one controller is configured to control the one or more propulsion units to restrict an increase in altitude beyond the altitude threshold, and restrict an increase in movement beyond the movement threshold.

15. The system according to claim 1,
wherein, when in the normal mode, the at least one controller does not restrict altitude of the drone; and
wherein when in the stunt mode, the at least one controller does not limit a maximum tilt angle of the drone, thereby permitting inversions for performing aerial stunts.

16. An indoor/outdoor drone, comprising:
one or more motors operatively coupled to one or more propellers that enable aerial lift and movement of the drone when in flight;
at least one controller operatively coupled to the one or more motors, the at least one controller configured to switch between a training mode and a normal mode;
wherein, when the at least one controller is switched to the training mode, the at least one controller is configured to:
i) determine an actual altitude of the drone and actual speed of the one or more motors;
ii) determine an altitude threshold and a motor speed threshold;
iii) based upon a determination that the actual altitude is greater than or equal to the altitude threshold, restrict an increase in the actual altitude of the drone;
iv) based upon a determination that the actual altitude is less than the altitude threshold, permit an increase in the actual altitude of the drone;
v) based upon a determination that the actual speed of the one or more motors is greater than the motor speed threshold, restrict an increase in the actual speed of the one or more motors; and/or
vi) based upon a determination that the actual speed of the one or more motors is less than the motor speed threshold, permit an increase in the actual speed of the one or more motors;
wherein the at least one controller is configured to switch between the training mode, the normal mode, and a stunt mode in response to an input from a user; and
wherein, when in the training mode, the at least one controller is configured to prohibit switching to the stunt mode when the user actively selects the stunt mode without the user first actively disabling the training mode as a separate input from selecting the stunt mode.

17. A flight system for an aerial drone, comprising at least one electronic controller having a training mode, a normal mode, and a stunt mode, wherein:
when in the training mode, the at least one controller is configured to:
(i) restrict an increase in altitude of the drone beyond a training mode altitude threshold, and
(ii) restrict an increase in tilt angle of the drone beyond a maximum training mode tilt angle threshold so as to prevent aerial inversions of the drone;
when in the normal mode, the at least one controller is configured to:
(i) not restrict an increase in altitude of the drone, and
(ii) restrict an increase in tilt angle of the drone beyond a maximum normal mode tilt angle threshold so as to prevent aerial inversions of the drone; and
when in the stunt mode, the at least one controller is configured to:
(i) not restrict an increase in altitude of the drone, and
(ii) not restrict an increase in tilt angle of the drone so as to permit aerial inversions of the drone for performing aerial stunts;
the controller being configured to activate the training mode in response to an active input by a user to select the training mode, and deactivate the training mode in response to an active input by the user to deselect the training mode, and
the controller being configured to activate the stunt mode in response to an active input by a user to select the stunt mode;
wherein, when in the training mode, the at least one controller is configured to:
i) prohibit activation of the stunt mode without the user first actively deselecting the training mode as a separate input from actively selecting the stunt mode, and
ii) prohibit adjustment of the training mode altitude threshold.

18. The system according to claim 17, wherein only three distinct modes are selectable, the three distinct modes being the training mode, the normal mode, and the stunt mode.

* * * * *